United States Patent
Viegas et al.

(10) Patent No.: US 6,698,212 B2
(45) Date of Patent: Mar. 2, 2004

(54) CRYOGENIC TEMPERATURE CONTROL APPARATUS AND METHOD

(75) Inventors: Herman H. Viegas, Bloomington, MN (US); David J. Vander Woude, Farmington, MN (US); Jayaram Seshadri, Minneapolis, MN (US); John J. Shaw, Savage, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/185,757

(22) Filed: Jun. 27, 2002

(65) Prior Publication Data

US 2003/0019219 A1 Jan. 30, 2003

Related U.S. Application Data

(60) Provisional application No. 60/302,918, filed on Jul. 3, 2001.

(51) Int. Cl.[7] .................. F17C 9/02; F25D 17/02; B60H 1/32
(52) U.S. Cl. ............... 62/50.2; 62/239; 62/201
(58) Field of Search .................. 62/50.2, 239, 50.3, 62/201

(56) References Cited

U.S. PATENT DOCUMENTS

| | | |
|---|---|---|
| 2,535,364 A | 12/1950 | Lee |
| 2,720,084 A | 10/1955 | Hailey |
| 3,058,317 A | 10/1962 | Putman |
| 3,121,999 A | 2/1964 | Kasbohm et al. |
| 3,159,982 A | 12/1964 | Schachner |
| 3,307,366 A | 3/1967 | Smith |
| 3,314,007 A | 4/1967 | Johnson |
| 3,421,336 A | 1/1969 | Lichtenberger et al. |
| 3,507,128 A | 4/1970 | Murphy et al. |
| 3,552,134 A | 1/1971 | Arenson |
| 3,621,673 A | 11/1971 | Foust |
| 3,667,246 A * | 6/1972 | St. Lorant et al. ............ 62/208 |
| 3,693,370 A | 9/1972 | Miller |
| 3,694,750 A | 9/1972 | Schuhrke |
| 3,712,073 A | 1/1973 | Arenson |
| 3,727,423 A | 4/1973 | Nielson |
| 3,740,961 A | 6/1973 | Fischer |

(List continued on next page.)

FOREIGN PATENT DOCUMENTS

FR 2217646 2/1973

OTHER PUBLICATIONS

SB–III CR Fact Sheet; Thermo King Corporation, Dec. 10, 1996.
SB–III CR Unit, Customer Site Requirements; Automatic Filing Station, Thermo King Corporation, Dec. 10, 1996.
SB–III CR Unit: Refueling Requirements, Thermo King Corporation, Dec. 10, 1996.

(List continued on next page.)

*Primary Examiner*—William C. Doerrler
(74) *Attorney, Agent, or Firm*—Michael Best & Friedrich LLP

(57) ABSTRACT

A cryogenic temperature control apparatus comprises a storage tank housing a quantity of cryogenic fluid, a housing defining a conditioned space, and a heat exchanger in thermal communication with the conditioned space. A first flow path fluidly connects the storage tank and the heat exchanger. A first valve is positioned along the first flow path to selectively fluidly seal the first flow path between the storage tank and the heat exchanger. A second flow path fluidly connects the storage tank and the heat exchanger. A second valve is positioned along the second flow path to selectively fluidly seal the second flow path between the storage tank and the heat exchanger.

18 Claims, 2 Drawing Sheets

U.S. PATENT DOCUMENTS

| | | |
|---|---|---|
| 3,788,091 A | 1/1974 | Miller |
| 3,802,212 A | 4/1974 | Martin et al. |
| 3,823,568 A | 7/1974 | Bijasiewicz et al. |
| 3,891,925 A | 6/1975 | Dimeff |
| 3,990,816 A | 11/1976 | Kohler et al. |
| 4,045,972 A | 9/1977 | Tyree, Jr. |
| 4,050,972 A | 9/1977 | Cardinal, Jr. |
| 4,060,400 A | 11/1977 | Williams |
| 4,082,968 A | 4/1978 | Jones |
| 4,100,759 A | 7/1978 | Tyree, Jr. |
| 4,165,618 A | 8/1979 | Tyree, Jr. |
| 4,171,495 A | 10/1979 | McNinch, Jr. |
| 4,186,562 A | 2/1980 | Tyree, Jr. |
| 4,201,191 A | 5/1980 | Zink et al. |
| 4,211,085 A | 7/1980 | Tyree, Jr. |
| 4,224,801 A | 9/1980 | Tyree, Jr. |
| 4,233,817 A | 11/1980 | Toth |
| 4,321,796 A | 3/1982 | Kohno |
| 4,333,318 A | 6/1982 | Tyree, Jr. |
| 4,334,291 A | 6/1982 | Geusic et al. |
| 4,348,873 A | 9/1982 | Yamauchi et al. |
| 4,350,027 A | 9/1982 | Tyree, Jr. |
| 4,356,707 A | 11/1982 | Tyree, Jr. et al. |
| 4,406,129 A | 9/1983 | Mills |
| 4,439,721 A | 3/1984 | Mura |
| 4,441,326 A | 4/1984 | Bernauer et al. |
| 4,498,306 A | 2/1985 | Tyree, Jr. |
| 4,543,793 A | 10/1985 | Chellis et al. |
| 4,576,010 A | 3/1986 | Windecker |
| 4,606,198 A | 8/1986 | Latshaw et al. |
| 4,608,830 A | 9/1986 | Peschka |
| 4,626,781 A | 12/1986 | Forkel |
| 4,688,390 A | 8/1987 | Sawyer |
| 4,693,737 A | 9/1987 | Tyree, Jr. |
| 4,695,302 A | 9/1987 | Tyree, Jr. |
| 4,706,468 A | 11/1987 | Howland et al. |
| 4,739,623 A | 4/1988 | Tyree, Jr. et al. |
| 4,748,818 A | 6/1988 | Satterness et al. |
| 4,783,972 A | 11/1988 | Tyree, Jr. et al. |
| 4,856,285 A | 8/1989 | Acharya et al. |
| 4,858,445 A | 8/1989 | Rasovich |
| 4,878,362 A | 11/1989 | Tyree, Jr. |
| 4,888,955 A | 12/1989 | Tyree, Jr. et al. |
| 4,903,495 A | 2/1990 | Howland et al. |
| 4,937,522 A | 6/1990 | Gee |
| 4,940,937 A | 7/1990 | Hattori et al. |
| 4,941,527 A | 7/1990 | Toth et al. |
| 4,995,234 A | 2/1991 | Kooy et al. |
| 5,029,288 A | 7/1991 | Kubota et al. |
| 5,040,374 A | 8/1991 | Micheau |
| 5,056,324 A | 10/1991 | Haley |
| 5,056,991 A | 10/1991 | Peschka et al. |
| 5,069,039 A | 12/1991 | Martin |
| 5,090,209 A | 2/1992 | Martin |
| 5,095,709 A | 3/1992 | Billiot |
| 5,124,602 A | 6/1992 | Nishimura et al. |
| 5,127,230 A | 7/1992 | Neeser et al. |
| 5,147,005 A | 9/1992 | Haeggstrom |
| 5,170,631 A | 12/1992 | Lang et al. |
| 5,172,559 A | 12/1992 | Renken et al. |
| 5,199,275 A | 4/1993 | Martin |
| 5,203,179 A | 4/1993 | Powell |
| 5,209,072 A | 5/1993 | Truckenbrod et al. |
| 5,243,821 A | 9/1993 | Schuck et al. |
| 5,259,198 A | 11/1993 | Viegas et al. |
| 5,267,443 A | 12/1993 | Roehrich et al. |
| 5,267,446 A | 12/1993 | Viegas et al. |
| 5,285,644 A | 2/1994 | Roehrich et al. |
| 5,287,705 A | 2/1994 | Roehrich et al. |
| D345,009 S | 3/1994 | Lewis et al. |
| 5,291,130 A | 3/1994 | Kendzior |
| 5,293,748 A | 3/1994 | Flanigan |
| 5,305,825 A | 4/1994 | Roehrich et al. |
| 5,311,927 A | 5/1994 | Taylor et al. |
| 5,313,787 A | 5/1994 | Martin |
| 5,315,840 A | 5/1994 | Viegas et al. |
| 5,317,874 A | 6/1994 | Penswick et al. |
| 5,320,167 A | 6/1994 | Johnson et al. |
| 5,333,460 A | 8/1994 | Lewis et al. |
| 5,365,744 A | 11/1994 | Viegas et al. |
| 5,396,777 A | 3/1995 | Martin |
| 5,410,886 A | 5/1995 | Wallace et al. |
| 5,410,890 A | 5/1995 | Arima |
| 5,456,084 A * | 10/1995 | Lee .......................... 62/51.1 |
| 5,458,188 A | 10/1995 | Roehrich et al. |
| 5,477,690 A | 12/1995 | Gram |
| 5,511,955 A | 4/1996 | Brown et al. |
| 5,533,340 A | 7/1996 | Shama et al. |
| 5,557,938 A | 9/1996 | Hanson et al. |
| 5,561,986 A | 10/1996 | Goodall |
| 5,564,277 A * | 10/1996 | Martin ....................... 62/50.3 |
| 5,598,709 A | 2/1997 | Viegas et al. |
| 5,606,870 A | 3/1997 | Lester |
| 5,669,223 A | 9/1997 | Haley et al. |
| 5,694,776 A | 12/1997 | Sahm |
| 5,699,670 A | 12/1997 | Jurewicz et al. |
| 5,711,161 A | 1/1998 | Gustafson |
| 5,730,216 A | 3/1998 | Viegas et al. |
| 5,775,110 A | 7/1998 | Waldron |
| 5,819,544 A | 10/1998 | Andonian |
| 5,870,897 A | 2/1999 | Barr et al. |
| 5,908,069 A | 6/1999 | Baldwin et al. |
| 5,916,246 A | 6/1999 | Viegas et al. |
| 5,921,090 A * | 7/1999 | Jurewicz et al. ............. 62/50.2 |
| 5,947,712 A | 9/1999 | Viegas et al. |
| 5,979,173 A | 11/1999 | Tyree |
| 5,996,472 A | 12/1999 | Nguyen et al. |
| 6,006,525 A | 12/1999 | Tyree, Jr. |
| 6,038,868 A | 3/2000 | Pooley et al. |
| 6,062,030 A | 5/2000 | Viegas |
| 6,076,360 A * | 6/2000 | Viegas et al. ................ 62/50.2 |
| 6,086,347 A | 7/2000 | Ryska et al. |
| 6,095,427 A | 8/2000 | Hoium et al. |
| 6,106,255 A | 8/2000 | Viegas et al. |
| 6,202,671 B1 | 3/2001 | Horstmann |
| 6,220,048 B1 | 4/2001 | Finan, Sr. et al. |
| 6,276,142 B1 | 8/2001 | Putz |

OTHER PUBLICATIONS

SB–III CR Features; Thermo King Corporation, Jan. 22, 1997.

Thermoguard P–CR Microprocessor Control System Revision 450 x Software TK51262–2–OD (Rev. 1, 06–01), Diagnostic Manual ,Copyright 2001—Thermo King Corp.—Minneapolis, MN.

SB–III CR Proof Copy TK51293–X.X, Copyright 2001—Thermo King Corp.—Minneapolis, MN, Dated Nov. 28, 2001.

SB–III CR TK 51309–2–OP (Rev. 07/01), Copyright 2001—Thermo King Corp.—Minneapolis, MN.

Liquid Carbon Dioxide Transport Refrigeration System; Herman Viegas, Thermo King Corporation, 314 West $90^{th}$ Street, Minneapolis, Minnesota USA 55420, Presented at The Seventh Cryogenics 2002 IIR International Conference in Prague, Czech Republic, Apr. 23–26, 2002.

* cited by examiner

CRYOGENIC TEMPERATURE CONTROL APPARATUS AND METHOD

CROSS-REFERENCE TO RELATED APPLICATION

This application claims priority under 35 U.S.C. §119 to a provisional patent application No. 60/302,918, filed on Jul. 3, 2001.

FIELD OF THE INVENTION

The invention relates generally to air conditioning and refrigeration systems, and more specifically to a cryogenic temperature control apparatus and a method of operating a cryogenic temperature control apparatus to pull down and maintain the temperature in an air-conditioned space.

BACKGROUND OF THE INVENTION

Air conditioning and refrigeration systems typical utilize a chloroflourocarbon (CFC) refrigerant in a mechanical refrigeration cycle. However, because of the suspected depleting effect of CFCs on stratospheric ozone ($O_3$), practical alternatives to the use of CFCs are being sought. One such practical alternative is a cryogenic temperature control system.

Conventional cryogenic temperature control systems typically utilize a cryogen such as carbon dioxide, liquid nitrogen, etc. Typically, the cryogen is compressed to a cool liquid state and is stored in a pressurized storage tank. The cryogen is directed along a conduit from the storage tank to an evaporator coil that extends through a heat exchanger. Relatively warm air is passed across the evaporator coil and is cooled by contact with the evaporator coil. Contact with the warm air heats and vaporizes the cryogen in the evaporator coil. After the heat transfer has occurred, the vaporized cryogen is typically exhausted to the atmosphere. Alternatively, cryogenic temperature control systems can be closed and can condense the vaporized refrigerant before recycling the refrigerant through the temperature control system. The cooled air is then returned to an air-conditioned space.

To allow cryogenic temperature control systems to operate in a heating mode or in a defrost mode, conventional cryogenic temperature control systems typically include a heating element. Conventional heating elements normally include a propane heater for superheating cryogen. During heating and defrost modes, the cryogen is heated by the propane heater. The heated cryogen gas is then directed through a set of electronically operated valves through the evaporator coil to either defrost the evaporator coil or to heat the air-conditioned space.

Conventional cryogenic temperature control systems typically include a series of sensors distributed throughout the system to record temperature and pressure values in various locations throughout the system. The data collected by the sensors is transmitted to an elaborate fuzzy logic based controller, which periodically determines the rate of change of the temperature of the discharge air, as well as the acceleration or deceleration of this rate of change. The controller then manipulates the operating parameters of the system by manipulating valves distributed throughout the system to achieve and maintain the set point temperature.

Different types of temperature control systems, including cryogenic systems, are currently used in mobile applications to control the temperature in a cargo compartment. Mobile temperature control systems are typically mounted on straight trucks, the trailer of a tractor-trailer combination, a refrigerated shipping container, a refrigerated railcar, and the like, to refrigerate air-conditioned spaces. It is generally desirable to maintain the temperature of an air-conditioned space within a relatively narrow range around a predetermined set point temperature. In this manner, temperature sensitive cargo can safely be stored and/or transported in the air-conditioned space. Refrigerated transport vehicles for frozen foods such as seafood, meat, ice, frozen deserts, and the like, must maintain the air-conditioned space at a set point temperature, which is normally below freezing. Similarly, refrigerated transport vehicles are also used to transport fresh foods and beverages, which must be maintained at a set point temperature that is normally above freezing. In this manner, the mobile temperature control system can be used to maintain the temperature of the cargo at or near the desired set point temperature during transportation so that the cargo is not damaged or spoiled during transportation.

The above-described conventional mobile temperature control apparatus must rapidly achieve the desired set point temperature within the air-conditioned space with only a minimum amount of cryogen, since the amount of cryogen that can be carried in such a system is limited. Further, the controllers used to operate conventional mobile temperature control apparatuses are generally relatively complex. These systems generally require substantial computing power and programming skill to properly implement and operate. The system complexity generally limits the flexibility of the system. Therefore, a cryogenic temperature control apparatus and method that efficiently utilizes the cryogen would be welcomed by users of such systems.

SUMMARY OF THE INVENTION

According to the present invention, a cryogenic temperature control apparatus includes a storage tank housing a quantity of cryogen, a housing defining a conditioned space, and a heat exchanger in thermal communication with the conditioned space. A first flow path fluidly connects the storage tank and the heat exchanger. A first valve is positioned along the first flow path between the storage tank and the heat exchanger. The first valve has a first open position and a first closed position. In the first open position, the first valve and the first flow path fluidly connect the storage tank and the heat exchanger. In the first closed position, the first valve fluidly seals the first flow path between the storage tank and the heat exchanger. A second flow path fluidly connects the storage tank and the heat exchanger. A second valve is positioned along the second flow path between the storage tank and the heat exchanger and has a second open position and a second closed position. In the second open position, the second valve and the second flow path fluidly connect the storage tank and the heat exchanger. In the second closed position, the second valve fluidly seals the second flow path between the storage tank and the heat exchanger.

In preferred embodiments, the present invention includes a controller. The controller is operable to move the first valve between the first open position and the first closed position and to move the second valve between the second open position and the second closed position.

A vehicle supports the cryogenic temperature control apparatus and includes an engine and an engine cooling system. The engine cooling system circulates an engine coolant through the engine. A heating coil is in fluid communication with the cooling system and extends through the heat exchanger. The heat exchanger is operable in a heating mode and includes a third valve. The third valve is operable to fluidly connect and to fluidly disconnect the heating coil and the engine cooling cycle. In the heating mode, the third valve selectively fluidly connects the heating coil and the engine cooling cycle.

The cryogenic temperature control apparatus is operable in a first cooling mode. In the first cooling mode, the first valve is in the first open position and the second valve is in the second closed position. The cryogenic temperature control apparatus is also operable in a second cooling mode and the first and second valves have different portings. In the second cooling mode the second valve is in the second open position and the first valve is in the first closed position.

The cryogenic temperature control apparatus is also operable in a third cooling mode. In the third cooling mode, the first valve is in the first open position and the second valve is in the second open position. The cryogenic control apparatus is operable in a fourth cooling mode. In the fourth cooling mode, the first valve is in the first closed position and the second valve is in the second closed position.

The cryogenic temperature control apparatus includes a fan, which has an operable condition and an idle condition. In the operable condition, the fan is operable to move a quantity of air across the heat exchanger. The controller is operable to shift the fan between the operable condition and the idle condition.

A temperature sensor is preferably positioned within the conditioned space. The temperature sensor is operable to shift the fan between the operable condition and the idle condition. The cryogenic temperature control apparatus also includes a second fan, which is operable to move air across the heat exchanger.

The cryogenic temperature control apparatus includes a conduit extending between the storage tank and the heat exchanger. The conduit has a first branch and a second branch. The first flow path follows the first branch of the conduit and the second flow path follows the second branch of the conduit.

According to the present invention, a method of controlling the temperature of a conditioned space with a heat exchanger includes providing a heat exchanger which is in thermal communication with a conditioned space. The heat exchanger includes a storage tank, which houses a cryogen, a first valve operable to fluidly connect the storage tank and the heat exchanger along a first fluid path, and a second valve operable to fluidly connect the storage tank and the heat exchanger along a second fluid path. The method further includes sensing the temperature in the conditioned space and comparing the temperature to a desired temperature. The first valve is opened to introduce cryogen into the heat exchanger through the first fluid path and air is moved from the conditioned space through the heat exchanger. The second valve is also preferably opened to introduce cryogen into the heat exchanger through the second valve along the second path. Preferably, the temperature in the conditioned space is sensed and compared to the desired temperature. The first and second valves are then closed, thereby preventing fluid from flowing along the first and second paths between the storage tank and the heat exchanger.

Preferably, the method of controlling the temperature in a conditioned space with a heat exchanger also includes sensing the temperature in the conditioned space and blowing air across the heat exchanger.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION

Figure 1:
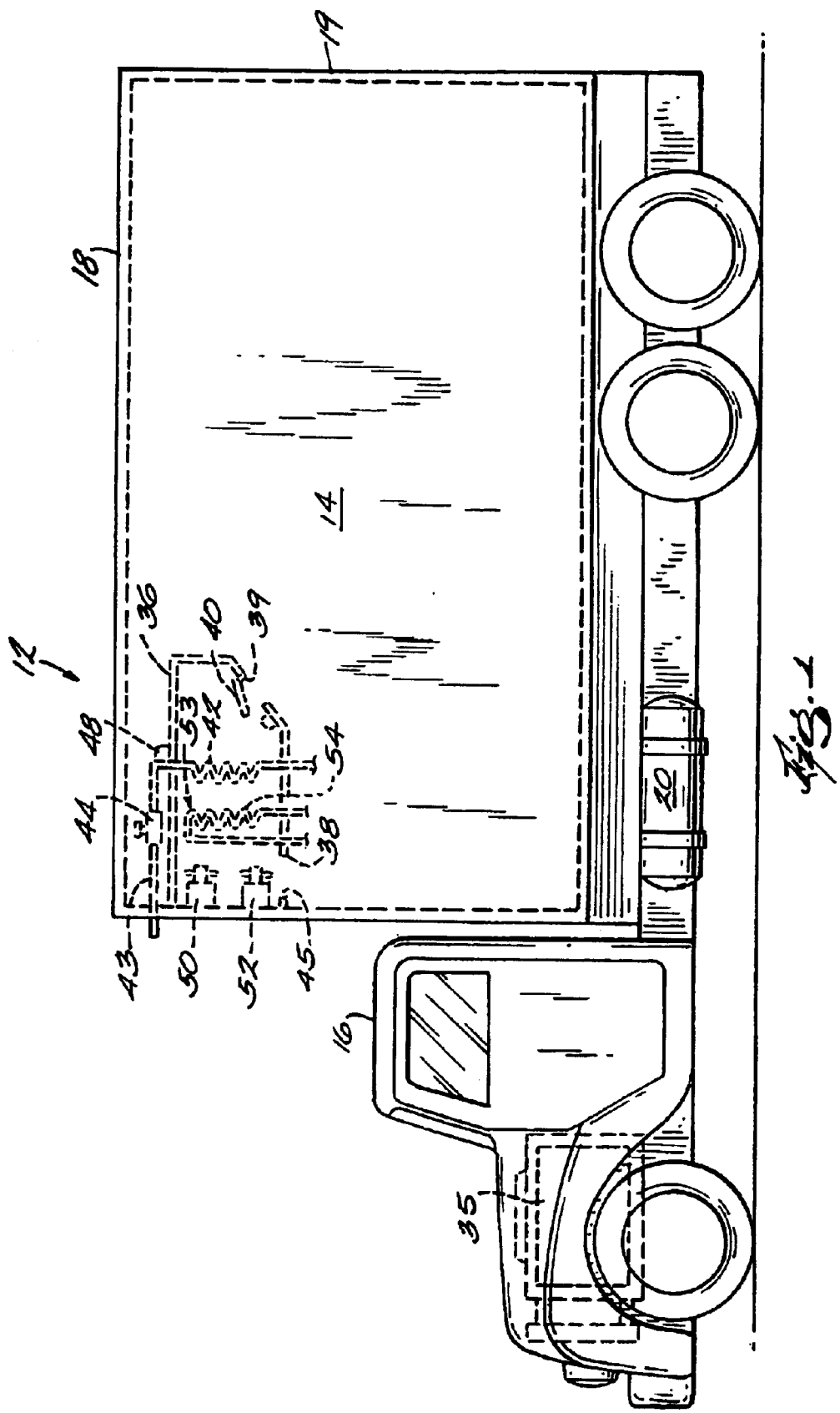
FIG. 1 is a side view of a truck including one embodiment of a cryogenic temperature control apparatus in accordance with the present invention.
Figure 2:
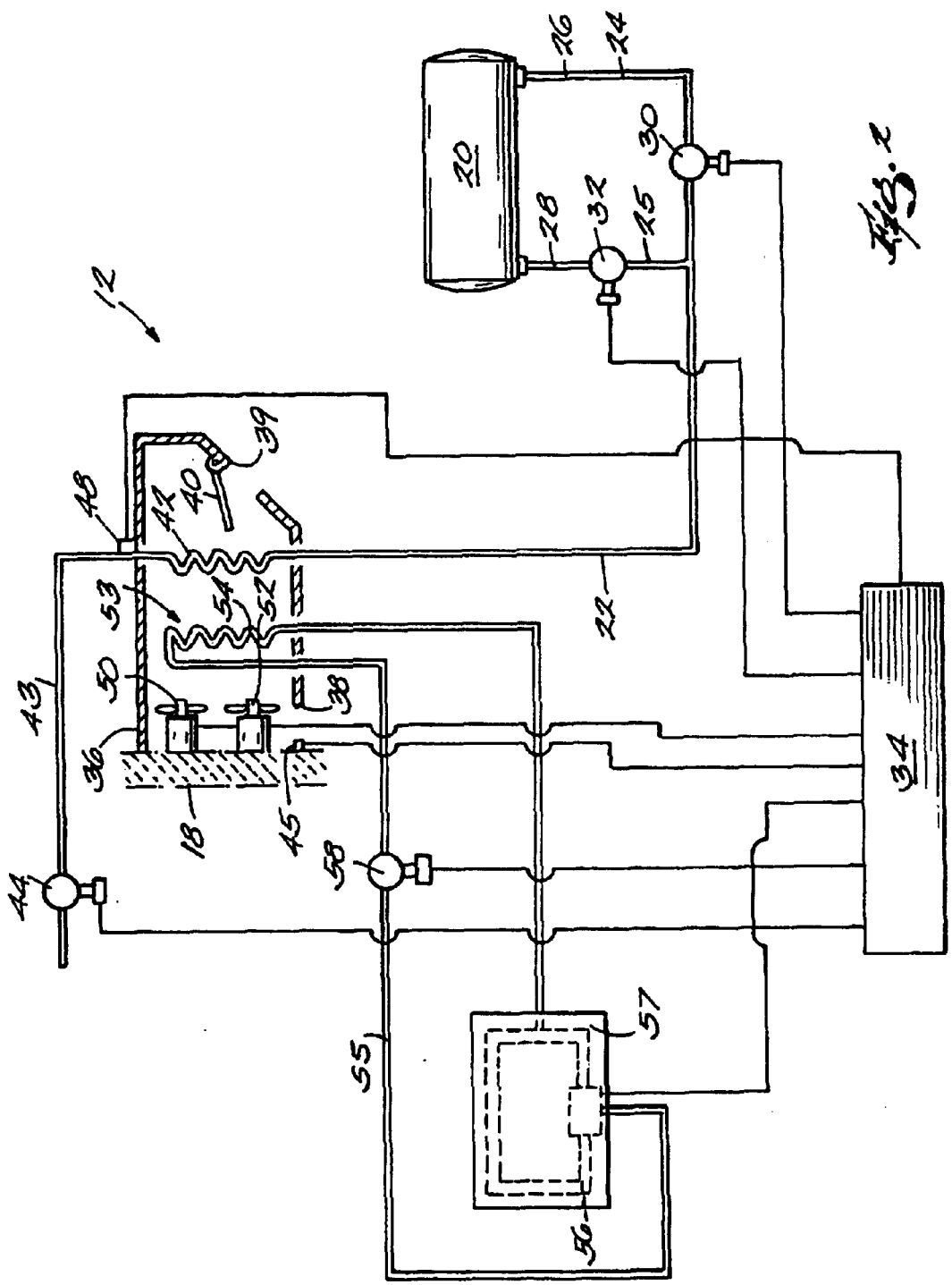
FIG. 2 is a schematic drawing of the cryogenic temperature control apparatus of FIG. 1.

FIGS. 1 and 2 illustrate a cryogenic temperature control apparatus 12 in accordance with the present invention. The cryogenic temperature control apparatus 12 is operable to control the temperature of an air-conditioned space 14, as shown in FIG. 1, enclosed in a truck 16. The cryogenic temperature control apparatus 12 can alternatively be used on other vehicles, such as a tractor-trailer combination, a container, and the like. Also, the cryogenic temperature control apparatus 12 can be used to condition air in the passenger space of a vehicle (e.g., a bus or a truck cab) for passenger comfort or the cryogenic temperature control apparatus 12 can be used to condition air in a cargo space. In some aspects, the cryogenic temperature control apparatus 12 can be used to condition air in the cargo space of a vehicle and can be used to condition air in the passenger space of the vehicle.

Alternatively, the cryogenic temperature control apparatus 12 can be operable in stationary applications. For example, the temperature control apparatus 12 can be operable to control the temperature of buildings, areas of buildings, storage containers, refrigerated display cases, and the like. In all cases, the air-conditioned space 14 preferably has an outer wall 18, which includes one or more doors 19, which open into the air-conditioned space 14 so that an operator can insert a product into and remove the product from the air-conditioned space 14.

As used herein and in the claims, the term "air-conditioned space" includes any space to be temperature and/or humidity controlled, including transport and stationary applications for the preservation of foods, beverages, and other perishables, maintenance of a proper atmosphere for the shipment of industrial products, space conditioning for human comfort, and the like. The cryogenic temperature control apparatus 12 is operable to control the temperature of the air-conditioned space 14 to a predetermined set point temperature ("SP"). It should be understood that in some applications, the temperature of the air-conditioned space 14 is controlled to a predetermined band adjacent the selected set point temperature SP.

As shown in FIG. 1, a fluid storage tank 20 containing a cryogen is mounted on the outer wall 18 of the truck 16. In other applications (not shown), the storage tank 20 can be mounted or affixed to any other location on the truck 16, including the truck frame, the bottom of the body of the truck 16, or any other place on the interior or exterior of the truck 16. The storage tank 20 stores the cryogen under pressure in a liquid state. However, it should be appreciated that in some applications, a portion of the cryogen in the storage tank 20 may be in a vapor state. More particularly, the storage tank 20 preferably maintains the cryogen under pressure at a level significantly above atmospheric pressure. In this manner, the pressure within the storage tank 20 supplies the motive force for moving the cryogen through the cryogenic temperature control apparatus 12.

The cryogen is preferably carbon dioxide ($CO_2$). However, it will be readily understood by one of ordinary skill in the art that other cryogens, such as $LN_2$ and LNG can also or alternately be used. However, cryogens that are environmentally friendly and are non-reactive are highly desirable for obvious reasons.

A conduit 22 is connected to the underside of the storage tank 20 and includes a first branch 24 and a second branch 25. The conduit 22, including the first branch 24, defines a first flow path 26. Similarly, the conduit 22, including the second branch 25, defines a second flow path 28. As shown in FIG. 1, the first and second branches 24, 25 are fluidly connected to the storage tank 20 and converge at a junction located downstream from the storage tank 20.

With reference to FIG. 2, the first branch 24 includes a first control valve 30. The first control valve 30 has a first porting and controls the mass flow rate of cryogen through the first branch 24 during heating and cooling cycles. The first control valve 30 is preferably moved between a first open position and a first closed position by an electrically controlled solenoid (not shown). However, in other applications, other valves and actuators can also or alternatively be used.

The second branch 25 also extends from a low point of the storage tank 20 and includes a second control valve 32. The second control valve 32 has a second porting, which is preferably smaller than the first porting. However, in some embodiments of the present invention, the first and second control valves 30, 32 can have the same porting. The second control valve 32 is preferably an electrically operated valve and controls the mass flow rate of cryogen through the second branch 25 during heating and cooling cycles. Preferably, the second control valve 32 is operated by an electrically controlled solenoid (not shown), which moves the second control valve 32 between a second open position and a second closed position. However, as explained above with respect to the first control valve 30, other valves and actuators can also or alternatively be used.

Additionally, as shown and described herein, the first and second control valves 30, 32 are preferably relatively simple on-off valves. However, one of ordinary skill in the art will appreciate that in other applications, one or both of the first and second control valves 30, 32 can be modulation valves, pulse valves, expansion valves, or the like. In these embodiments, the cryogenic temperature control apparatus 12 can include a greater variety of available mass flow rates between the storage tank 20 and an evaporator coil 42 (further described below). Similarly, other embodiments (not shown) include three or more branches. Each of these branches can include a control valve (not shown) for regulating the mass flow rate of cryogen out of the storage tank 20. In still other embodiments (not shown), the first and second branches 24, 25 can extend between the storage tank 20 and the evaporator coil 42 without converging at the junction.

The first and second control valves 30, 32 are controlled by a microprocessor controller 34. The controller 34 is preferably powered by the truck's engine 35 or by an alternator (not shown) positioned within the engine 35. In alternative embodiments, the controller 34 can also or alternatively be powered by a battery, a fuel cell, a generator, or the like. In still other embodiments (not shown), an external power supply, for example a wall socket on a building, can supply power to the controller 34.

As shown in FIG. 1, a heat exchanger 36 is positioned within the air-conditioned space 14 and includes an air intake 38 and an air outlet 39. In operation, air from the air-conditioned space 14 enters the heat exchanger 36 through the air intake 38 and is exhausted through the air outlet 39. As shown in FIG. 2, the air outlet 39 includes a damper 40, which is adjustable between a number of positions to open and close the air outlet 39.

The conduit 22 is fluidly connected to an inlet of an evaporator coil 42 located in the heat exchanger 36. During cooling operations, cryogen from the storage tank 20 flows along the first and/or second flow paths 26, 28 in a liquid or mostly liquid state into the evaporator coil 42. Air from the air-conditioned space 14 travels across the evaporator coil 42 and is cooled by contact with the relatively cold evaporator coil 42. At the same time, the cryogen in the evaporator coil 42 is vaporized by contact with the relatively warm air. The cooled air is returned to the air-conditioned space 14 through the air outlet 39 to cool the air-conditioned space 14 and the vaporized cryogen flows out of the evaporator coil 42 through the outlet 43 and is exhausted to the atmosphere.

The outlet 43 includes a back pressure regulator 44. The back pressure regulator 44 may automatically regulate the cryogen vapor pressure above a predetermined value (e.g., the triple point of the cryogen) or the back pressure regulator 44 may be electrically operated and controlled by the controller 34. Alternatively, a mechanical type, automatic back pressure regulating valve can be used. The back pressure regulator 44 maintains the pressure within the evaporator coil 42 at a desired pressure. Preferably, the desired pressure is equal to or greater than the triple point of the cryogen. For example, in applications in which the cryogen is carbon dioxide, the back pressure regulator 44 maintains the pressure in the evaporator coil 42 at 60.43 psig.

A return air temperature sensor 45 is located in the air inlet 38 to record the temperature of the air ("RA") as the air enters the heat exchanger 36. The return air temperature sensor 45 is preferably an analog sensor with an operating range from −50° C. to 70° C. (−58° F. to 158° F.) and is in electrical communication with the controller 34.

An evaporator coil outlet temperature sensor 48 is positioned adjacent the outlet 43. The evaporator coil outlet temperature sensor 48 records the temperature of cryogen vapor ("ECOT") exiting the heat exchanger 36. The evaporator coil outlet temperature sensor 48 is preferably an analog sensor with an operating range from −50° C. to 70° C. (−58° F. to 158° F.) and is in electrical communication with the controller 34.

A first fan 50 and a second fan 52 are positioned within the heat exchanger 36 and are operable to draw air from the air-conditioned space 14 through the heat exchanger 36. As shown in the figures, the first fan 50 can be positioned above the second fan 52. Alternatively, the first and second fans 50, 52 can be arranged side-by-side or in any other configuration as dictated by space concerns.

As shown in FIG. 2, a heating element 53 is located in the heat exchanger 36 and includes a heating coil 54 and a fluid conduit 55, which extends between the heating coil 54 and a coolant cycle 56 located in the truck's engine 35. A third valve 58 is positioned along the fluid conduit 55 for controlling the flow of engine coolant from the cooling cycle to the heating coil 54. During operation, the engine 35 heats the coolant in the coolant cycle 56. When heating is required, the third valve 58 is opened and coolant 56 is directed through the heating element 53 to heat air in the heat exchanger 36. In other embodiments, other fluids can be heated and can be directed through the heating coil 54 to heat air in the heat exchanger 36. In still other embodiments, other heating elements 53, for example electrical heaters (not shown), can also or alternatively be used to heat air in the heat exchanger 36.

As shown in FIG. 2, the heating element 53 is positioned between the fans 50, 52 and the evaporator coil 42. However, in other arrangements, the evaporator coil 42 can be positioned between the fans 50, 52 and the heating element 53. Additionally, in some embodiments, the heating element 53 and the evaporator coil 42 can be combined to conserve space.

The controller 34 is preferably programmed to operate the cryogenic temperature control apparatus 12 in at least six different modes, including a First Cooling Mode, a Second Cooling Mode, a Third Cooling Mode, a Fourth Cooling Mode, a Heating Mode, and a Defrost Mode. In the First Cooling Mode or super cooling mode, the first and second valves 30, 32 are open to provide a maximum mass flow rate of cryogen from the storage tank 20 to the evaporator coil 42. In this manner, the cryogenic temperature control apparatus 12 can rapidly pull down the temperature of the air-conditioned space 14. The controller 34 is programmed to operate the cryogenic temperature control apparatus 12 in the First Cooling Mode for a relatively short time after loading or when the temperature of the air-conditioned space 14 is significantly above the set point temperature SP.

When less cooling is required or when the temperature of the air-conditioned space 14 is relatively close to the set point temperature SP, the controller 34 preferably shifts the cryogenic temperature control apparatus 12 into the Second Cooling Mode to conserve cryogen. In the Second Cooling Mode, the first control valve 30 remains open and the second control valve 32 is closed, thereby reducing the mass flow rate of cryogen from the storage tank 20 through the evaporator coil 42 to a second lower mass flow rate.

As the temperature in the air-conditioned space 14 continues to drop, the controller 34 is preferably programmed to shift the cryogenic temperature control apparatus 12 into the Third Cooling Mode, corresponding to a third lower flow rate. In the Third Cooling Mode, the first control valve 30 is closed and the second control valve 32 is opened to provide a third mass flow rate.

Once the temperature of the air-conditioned space 14 is at or relatively near the set point temperature SP, the controller 34 preferably shifts the cryogenic temperature control apparatus 12 into the Fourth Cooling Mode or the Null Mode. In the Fourth Cooling Mode, the first and second control valves 30, 32 are both closed to provide a forth mass flow rate in which cryogen does not flow from the storage tank 20 to the evaporator coil 42.

When the cryogenic temperature control apparatus 12 is operating in the First, Second, Third, and Fourth Cooling Modes, the first and second fans 50, 52 are in operation. Additionally, the damper 40 is in the open position so that air can flow through the heat exchanger 36. Alternatively, a person of ordinary skill in the art will appreciate that the first and/or second fan 50, 52 can be cycled on and off during the First, Second, Third, and Fourth Cooling Modes by a timer, (not shown), upon an operator's command, or by the controller 34.

When the set point temperature SP is below the ambient temperature, such as for example, in relatively cold climates, the controller 34 is preferably operable to shift the cryogenic temperature control apparatus 12 into the Heating Mode. When the cryogenic temperature control apparatus 12 is shifted into the Heating Mode, the first and second control valves 30, 32 are closed to prevent cryogen from entering the evaporator coil 42 and the third valve 58 is opened to allow relatively warm engine coolant to enter the heating element 53. The first and second fans 50, 52 are turned on to direct air from the air-conditioned space 14 past the heating element 53 to absorb heat from the heating element 53 and to direct the air through the air outlet 39 back into the air-conditioned space 14.

In some instances water vapor from the air-conditioned space 14 can be separated from the air and can condense on the evaporator coil 42, forming frost. To minimize the formation of frost on the evaporator coil 42 and to remove frost from the evaporator coil 42, the controller 34 is programmed to operate the temperature control apparatus 12 in the Defrost Mode.

In the Defrost Mode, the controller 34 is programmed to close both the first and second valves 30, 32, close the damper 40, and open the third valve 58. In this manner, the heating element 53 heats the air within the heat exchanger 36 until the evaporator coil 42 is defrosted and the damper 40 prevents the heated air from entering the air-conditioned space 14. Additionally, in some embodiments, the first and second fans 50, 52 are turned off during the Defrost Mode to prevent unnecessary heating of the air-conditioned space 14.

The cryogenic temperature control apparatus 12 can be shifted into the Defrost Mode in four different manners. First, the controller 34 is programmed to shift the temperature control apparatus 12 into the Defrost Mode based upon data supplied by the air return sensor 45 and the evaporator coil exit temperature sensor 48. For example, the controller 34 may be programmed to shift the cryogenic temperature control apparatus 12 into the Defrost Mode if the evaporator coil outlet temperature sensor 48 records an evaporator coil outlet temperature ECOT that is below a predetermined value (e.g., −40° C.).

Second, the controller 34 is programmed to periodically cycle through the Defrost Mode at predetermined time intervals, such as for example, every hour. Third, the controller 34 includes a user interface (not shown), which allows an operator to manually initiate the Defrost Cycle. Fourth, the controller 34 is programmed to shift the cryogenic temperature control apparatus 12 into the Defrost Mode if the difference between return air temperature RA and the evaporator coil exit temperature ECOT is greater than a predetermined value (i.e., 8° C.).

Although particular embodiments of the present invention have been shown and described, other alternative embodiments will be apparent to those skilled in the art and are within the intended scope of the present invention.

What is claimed is:

1. A cryogenic temperature control apparatus operable in a cooling mode, the cryogenic temperature control apparatus comprising:

a storage tank housing a quantity of cryogen;

a housing defining a conditioned space;

a heat exchanger in thermal communication with the conditioned space;

a first flow path fluidly connecting the storage tank and the heat exchanger;

a first valve positioned along the first flow path between the storage tank and the heat exchanger, the first valve having a first open position, in which cryogen is moveable along the first flow path between the storage tank and the heat exchanger, and a first closed position, in which the first valve fluidly seals the first flow path between the storage tank and the heat exchanger, the first valve being in the first open position during operation in the cooling mode to accommodate movement of cryogen along the first flow path;

a second flow path fluidly connecting the storage tank and the heat exchanger; and a second valve positioned along the second flow path between the storage tank and the heat exchanger, the second valve having a second open position, in which cryogen is moveable along the second flow path between the storage tank and the second heat exchanger, and a second closed position, in which the second valve fluidly seals the second flow path between the storage tank and the heat exchanger, the second valve being in the second open position during operation in the cooling mode to accommodate movement of cryogen along the first flow path.

2. The cryogenic temperature control apparatus of claim 1, further comprising a controller operable to selectively move the first valve between the first open position and the first closed position and to selectively move the second valve between the second open position and the second closed position.

3. The cryogenic temperature control apparatus of claim 1, further comprising a heating coil extending through the heat exchanger.

4. A cryogenic temperature control apparatus, comprising:
a storage tank housing a quantity of cryogen;
a housing defining a conditioned space;
a heat exchanger in thermal communication with the conditioned space;
a first flow path fluidly connecting the storage tank and the heat exchanger;
a first valve positioned along the first flow path between the storage tank and the heat exchanger, the first valve having a first open position and a first closed position, wherein with the first valve in the first open position the first flow path fluidly connects the storage tank and the heat exchanger and in the first closed position the first valve fluidly seals the first flow path between the storage tank and the heat exchanger;
a second flow path fluidly connecting the storage tank and the heat exchanger;
a second valve positioned along the second flow path between the storage tank and the heat exchanger, the second valve having a second open position and a second closed position, wherein with the second valve in the second open position the second valve and the second flow path fluidly connects the storage tank and the heat exchanger and in the second closed position the second valve fluidly seals the second flow path between the storage tank and the heat exchanger; and
a heating coil extending through the heat exchanger;
wherein a vehicle supports the housing, the vehicle having an engine and an engine cooling system, the engine cooling system circulating an engine coolant through the engine, and wherein the heating coil is in fluid communication with the engine cooling system.

5. A cryogenic temperature control apparatus, comprising:
a storage tank housing a quantity of cryogen;
a housing defining a conditioned space;
a heat exchanger in thermal communication with the conditioned space;
a first flow path fluidly connecting the storage tank and the heat exchanger;
a first valve positioned along the first flow path between the storage tank and the heat exchanger, the first valve having a first open position and a first closed position, wherein with the first valve in the first open position the first flow path fluidly connects the storage tank and the heat exchanger and in the first closed position the first valve fluidly seals the first flow path between the storage tank and the heat exchanger;
a second flow path fluidly connecting the storage tank and the heat exchanger; and
a second valve positioned along the second flow path between the storage tank and the heat exchanger, the second valve having a second open position and a second closed position, wherein with the second valve in the second open position the second valve and the second flow path fluidly connects the storage tank and the heat exchanger and in the second closed position the second valve fluidly seals the second flow path between the storage tank and the heat exchanger;
a heating coil extending through the heat exchanger, wherein a vehicle supports the housing, the vehicle having an engine and an engine cooling system; and
a third valve being operable to selectively fluidly connect and fluidly disconnect the heating coil and the engine cooling system.

6. The cryogenic temperature control apparatus of claim 1, wherein the cryogenic temperature control apparatus is operable in a second cooling mode, the first valve being in the first open position and the second valve being in the second closed position during operation in the second cooling mode.

7. The cryogenic temperature control apparatus of claim 6, wherein the first valve has a first porting and the second valve has a second porting, the first porting being different than the second porting, the cryogenic temperature control apparatus being operable in a third cooling mode wherein the second valve is in the second open position and the first valve is in the first closed position.

8. The cryogenic temperature control apparatus of claim 7, wherein the cryogenic temperature control apparatus is operable in a fourth cooling mode wherein the first valve is in the first closed position and the second valve is in the second closed position.

9. The cryogenic temperature control apparatus of claim 1, further comprising a fan having an operable condition and an idle condition, in the operable condition the fan being operable to move a quantity of air across the heat exchanger.

10. The cryogenic temperature control apparatus of claim 9, further comprising a controller, the controller being operable to shift the fan between the operable condition and the idle condition.

11. The cryogenic temperature control apparatus of claim 10, further comprising a temperature sensor in the conditioned space, the temperature sensor communicating with the controller to shift the fan between the operable condition and the idle condition.

12. The cryogenic temperature control apparatus of claim 9, further comprising a second fan for moving a second quantity of air across the heat exchanger.

13. The cryogenic temperature control apparatus of claim 1, further comprising a temperature sensor in the conditioned space, the temperature sensor communicating with the controller to move the first valve between the first open position and the first closed position and to move the second valve between the second open position and the second closed position.

14. The cryogenic temperature control apparatus of claim 1, further comprising a conduit extending between the storage tank and the heat exchanger, the conduit having a first branch and a second branch, and wherein the first flow path follows the first branch of the conduit and the second flow path follows the second branch of the conduit.

15. A method of controlling the temperature of a conditioned space with a heat exchanger, the conditioned space having a temperature, the heat exchanger being in thermal communication with the conditioned space, the heat exchanger including a storage tank housing cryogen, a first valve operable to fluidly connect the storage tank and the heat exchanger along a first flow path, and a second valve operable to fluidly connect the storage tank and the heat exchanger along a second flow path, the method comprising:

providing a desired temperature for the conditioned space;

sensing the temperature of the conditioned space;

comparing the temperature of the conditioned space and the desired temperature;

initiating a cooling mode if the temperature of the conditioned space is below the desired temperature;

opening the first valve and introducing cryogen into the heat exchanger through the first valve along the first path;

moving air from the conditioned space through the heat exchanger; and opening the second valve and introducing cryogen into the heat exchanger through the second valve along the second path.

16. The method of claim 15, wherein the heat exchanger includes a fan and the method further comprises blowing air across the heat exchanger with the fan.

17. The method of claim 15, further comprising:

providing a second desired temperature;

sensing the temperature of the conditioned space;

comparing the temperature of the conditioned space and the second desired temperature;

initiating a second cooling mode if the temperature of the conditioned space is above the second desired temperature; and closing the first valve and preventing fluid from flowing along the first path between the storage tank and the heat exchanger.

18. The method of claim 17, further comprising:

providing a third desired temperature;

sensing the temperature of the conditioned space;

comparing the temperature of the conditioned space and the third desired temperature;

initiating a third cooling mode if the temperature of the conditioned space is above the third desired temperature;

opening the first valve and introducing cryogen into the heat exchanger through the first valve along the first path; and closing the second valve and preventing fluid from flowing along the second path between the storage tank and the heat exchanger.

* * * * *